United States Patent [19]

Park

[11] Patent Number: 5,733,131
[45] Date of Patent: Mar. 31, 1998

[54] EDUCATION AND ENTERTAINMENT DEVICE WITH DYNAMIC CONFIGURATION AND OPERATION

[75] Inventor: Michael C. Park, Portland, Oreg.

[73] Assignee: Seiko Communications Holding N.V., Netherlands Antilles

[21] Appl. No.: 283,276

[22] Filed: Jul. 29, 1994

[51] Int. Cl.$^6$ .............................. G09B 5/00; G08B 5/22; A63H 3/00; H04B 7/00
[52] U.S. Cl. .................. 434/307 R; 340/825.44; 340/825.47; 446/268; 446/297; 455/38.2
[58] Field of Search .............. 434/307 R; 446/268, 446/297; 340/825, 825.07, 825.22, 825.24, 825.25, 825.44, 825.47, 286.01, 286.06, 286.13; 375/259, 316; 455/38.2

[56] References Cited

U.S. PATENT DOCUMENTS

| | | | |
|---|---|---|---|
| 4,807,031 | 2/1989 | Broughton et al. | 358/142 |
| 4,840,602 | 6/1989 | Rose | 446/175 |
| 4,846,693 | 7/1989 | Baer | 434/308 |
| 4,857,840 | 8/1989 | Lanchais | 324/207 |
| 4,973,952 | 11/1990 | Malec et al. | 340/825.35 |
| 5,061,921 | 10/1991 | Lesko et al. | 340/815.24 |
| 5,191,615 | 3/1993 | Aldava et al. | 381/3 |
| 5,309,153 | 5/1994 | Gaskill et al. | 340/825.44 |

FOREIGN PATENT DOCUMENTS

| | | |
|---|---|---|
| 5184728 | 7/1993 | Japan . |
| WO-A-88/09091 | 11/1988 | WIPO . |
| WO-A-91/10490 | 7/1991 | WIPO . |
| WO-A-94/08677 | 4/1994 | WIPO . |
| WO-A-95/12955 | 5/1995 | WIPO . |

Primary Examiner—Richard J. Apley
Assistant Examiner—John E. Rovnak
Attorney, Agent, or Firm—Elmer Galbi

[57] ABSTRACT

A one-way individual or group addressable communication link by paging system protocol delivers to a small data terminal of an entertainment or education device command messages relevant to current real world information such as news or weather information, and also relevant to current television series storylines. The device provides a separate and independent mechanism augmenting educational or entertainment aspects of current events or television programming without requiring an expensive user interface mechanism in implementation of complex and robust control and configuration features.

3 Claims, 10 Drawing Sheets

```
              250
                ↘
                   ╱252a    ╱252b    ╱252c
            252╲Load Text,  text data,  index
                   ╱254a    ╱254b      ╱254c
            254╲Load Sound, Sound data, index
                   ╱256a    ╱256b   ╱256c
            256╲Announce,   Index,  When
                   ╱258a              ╱258b      ╱258c
            258╲Load Program, Program Code, Index
                   ╱260a     ╱260b   ╱260c
            260╲Execute Program, Index,  When
```

EDUCATION AND ENTERTAINMENT DEVICE WITH DYNAMIC CONFIGURATION AND OPERATION

BACKGROUND OF THE INVENTION

The present invention relates generally to entertainment and education devices, and particularly to the control and programming of electronic entertainment and education devices.

Education and entertainment devices in the electronic arts have evolved significantly. Many devices possess sophisticated user defined control features and activity presentation. In support of such sophisticated operations, however, comes a need for a user interface. Typically, a user interface requires at least a set of input devices, e.g., buttons, the user manipulates to modify or customize operation of the device. Thus, the user physically manipulates a user interface mechanism to modify or customize operation of the device. Cost of manufacture for the typical user interface mechanism can be a significant portion of overall product cost of manufacture, especially in inexpensive product lines. Given sophisticated control circuitry, e.g., a microprocessor, a user interface can be implemented by relatively few buttons, but requires complex interaction by the user. Depending on the number and configuration of input buttons, use of the device often is cumbersome and, therefore, in many cases not fully used or enjoyed by the owner. For a more sophisticated and less complex to use interface mechanism, e.g., a keyboard and display screen, significant additional manufacturing expense results.

Elaborate user interface devices are not practical for many education and entertainment devices, especially for relatively inexpensive consumer products. The manufacturer finds challenge in providing adequate user interface resources at minimum cost. In any case, requiring the user to manipulate a complicated array of buttons, or just several buttons according to a sophisticated set of directions, typically removes these capabilities from day-to-day use of the device. Many people simply fail to fully use the entertainment or educational device resources, i.e., customized programming by way of user interface, due to a difficult user interface.

The user interface, therefore, in an inexpensive electronic device represents a significant portion of the overall cost of manufacture. Electronic control circuitry can be inexpensive relative to overall product cost, yet possess extremely complex ability through sophisticated electrical circuit design, programming techniques and methods of integrated circuit manufacture. A manufacturer can with relatively little additional expense add complex control circuitry to an education or entertainment device, but adds significant cost for any user interface making convenient use of such control circuitry. In this respect, the cost of user interface resources restricts product design and operation. Thus, the user interface remains a challenge to a manufacturer wishing to provide access to sophisticated control features of electronic educational and entertainment devices.

Education and entertainment devices often provide the user only a limited period of enjoyment and utility. For example, an entertainment device may be manufactured with a given set of characteristics, attributes, or capabilities which the user finds fascinating at first, yet after fully exploring the device finds less excitement and eventually boredom in use. Similarly, for an education device produced with a given set of lessons or areas of teaching focus, the user finds little utility in such features once mastered. Incorporating elaborate user interface resources supporting sophisticated user programming or device modification maintains interest in an electronic education or entertainment device, but quickly takes the device into a higher price range. Thus, it would be desirable to incorporate robust and modifiable characteristics, attributes, and capabilities in an education and entertainment device without incurring significant additional manufacturing expense.

User interface mechanisms physically manipulated by the user eventually wear, and are therefore subject to deterioration and potential failure through use. To the extent that a user interface mechanism withstands wear and has higher reliability in performance, cost of manufacture also increases. Accordingly, it would be desirable to provide a user interface not subject to wear, yet still possess the desirable characteristic of relatively inexpensive implementation.

The subject matter of the present invention addresses and solves these problems in manufacture of electronic educational and entertainment devices.

SUMMARY OF THE INVENTION

The present invention in a preferred form thereof, provides an entertainment system including a plurality of addressable entertainment devices. A data terminal within each entertainment device collects control messages provided by radio signal broadcast and addressed thereto. A transmitter providing by radio signal the control message includes addressing relative to selected data terminals. A control of each entertainment device responds to the associated data terminal to establish operation of the entertainment device containing the data terminal in response to collected control messages. Thus, the present invention provides a dynamic and on-going device configuration manipulated by remote control.

In accordance with one aspect of the present invention, a method of entertainment augments a given storyline by providing, in a radio signal, addressed control messages and receiving at entertainment devices the control messages when addressed thereto. The entertainment device modifies its operation in response to received control messages. The control messages include information relevant to the given storyline making the entertainment device integral to the storyline and thereby augmenting its entertainment value. According to one aspect of the invention, the entertainment device adopts a form corresponding to the form of a character in the storyline, thereby further reinforcing integration of the entertainment device into the storyline.

In accordance with another aspect of the present invention, a method of entertainment includes transmission of, by first signal, an entertainment presentation including a given storyline. An entertainment display device receives the first signal and displays the broadcast presentation. A second signal broadcast provides control messages received at at least one entertainment device. The entertainment device, in response to received control messages, modifies its operation. The control messages include information relevant to the given storyline whereby the entertainment device becomes integral to storyline.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

The present invention finds application in ongoing and dynamic configuration and use of personal electronic devices, e.g., inexpensive educational and entertainment toys, by centrally providing a mechanism altering the configuration or characteristics of such personal electronic devices by remote user interface. More particularly, the present invention incorporates an individual and group addressable radio receiving device within the personal electronic device as a substitute user interface mechanism. With such device in place, sophisticated information and programming enters the personal electronic device without requiring direct manipulation by the owner. The device need not include user accessible data entry or control mechanisms, typically a relatively expensive component for small electronic devices, yet may collect specific control data or programming code in augmentation of ongoing or re-defined device operation. An inexpensive education and entertainment device incorporates sophisticated but inexpensive electronic control circuitry, but not a relatively expensive user interface mechanism directly and physically manipulated by the user. As will be described more fully hereafter, the device acquires a variety of new attributes, capabilities, and characteristics. This maintains interest in the device and thereby continuously supports the desirable objectives of education and entertainment.

Figure 1:
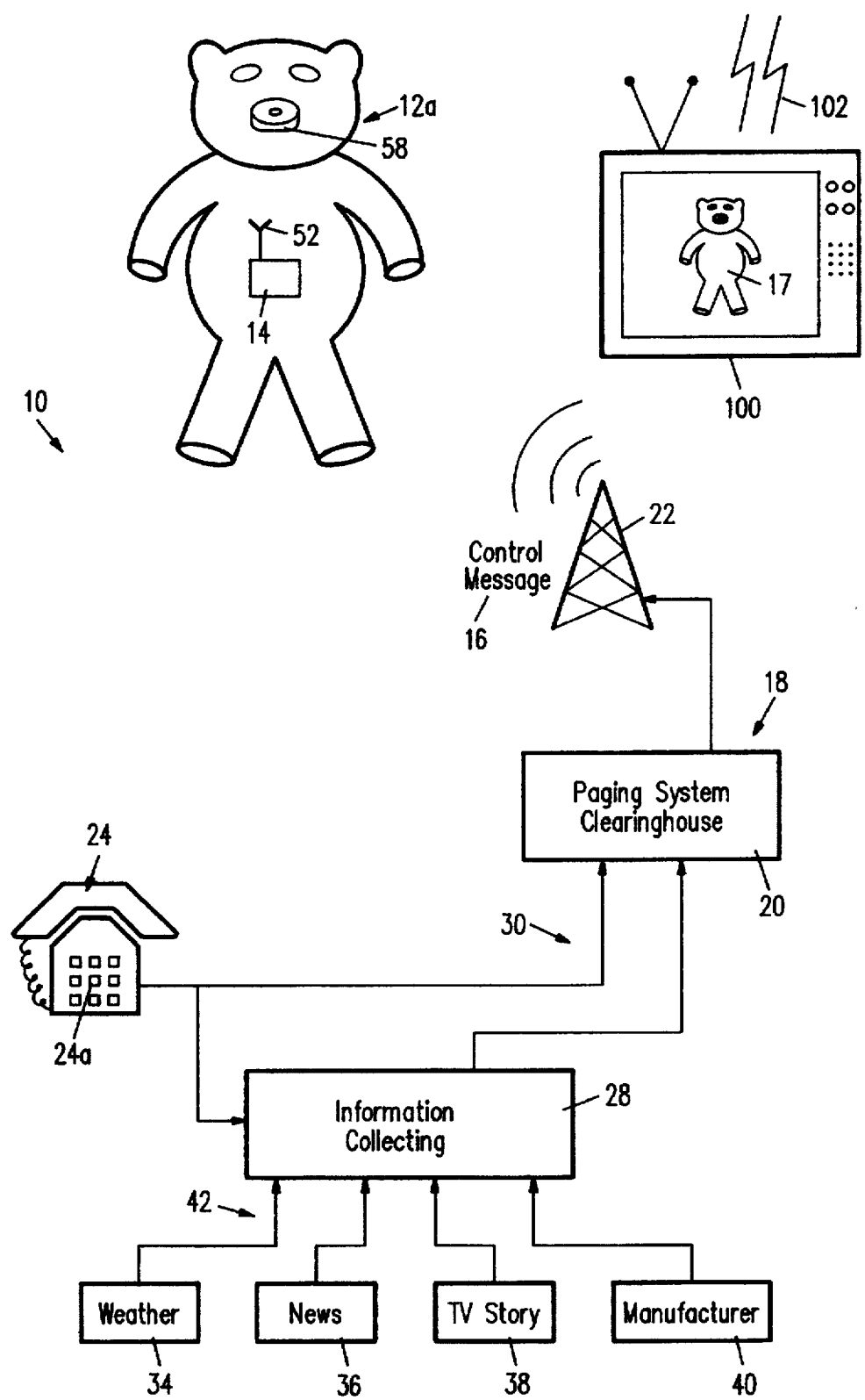
FIG. 1 illustrates an entertainment and education system according to a preferred embodiment of the present invention.

FIG. 1 illustrates generally an education and entertainment system 10 providing an education and entertainment device 12. The following disclosure illustrates examples of education and entertainment devices 12 distinguished individually by reference numeral subscript, i.e., device 12a, device 12b, etc. In the illustrated example of FIG. 1, device 12a is a toy bear doll. Device 12 may be one of a variety of personal electronic devices desirably controlled, altered in operation, or customized according to user preference. Accordingly, it will be understood that the present invention is not limited to the particular dolls or entertainment devices illustrated herein, but may encompass a spectrum of personal electronic devices.

Furthermore, while illustrated in FIG. 1 as a single device 12, it will be understood that the present invention contemplates a population of such individually addressable devices 12 operating under education and entertainment system 10. Also, within this population of devices 12, groups of devices 12 may be defined whereby separate education and entertainment device product lines may be implemented as separately addressed groups of devices 12 operating within system 10.

Device 12 includes an electronic control module 14. As described more fully hereafter, control module 14 performs tasks such as, in the case of the illustrated bear doll device 12a, interacting with a child by speaking to the child. Other illustrated embodiments of the present invention include such features as modified mechanical activity, visual stimulus, or any of a broad spectrum of education and entertainment device activity. Control module 14 constitutes, in accordance with the present invention, a portion of the user interface for device 12. More particularly, the user, user's parents, a service provider, or a manufacturer provide to device 12 by radio signal selected control messages 16 causing module 14 to perform a designated activity, or alter its configuration to adopt new attributes or characteristics.

A paging system 18 broadcasts control messages 16 to each device 12, thereby providing remote access to the electronic control module 14. As may be appreciated, and as described more fully hereafter, electronic control module 14 includes a paging system radio receiving input stage for collecting and further processing control message 16.

Paging system 18 includes a clearinghouse 20 coupled to radio signal broadcasting facilities 22. The present invention may be implemented according to many paging system protocols, but illustrated herein operating under a time-division multiplexed protocol, hereafter the "Gaskill paging system", as illustrated in U.S. Pat. Nos. 4,713,808 and 4,897,835. The disclosures of U.S. Pat. Nos. 4,713,808 and 4,897,835 are incorporated herein fully by reference thereto. The Gaskill paging system and associated receiving devices provide an inexpensive, highly battery-efficient and highly miniaturized paging device which, under the illustrated embodiments of the present invention, constitutes a portion of the electronic control module 14.

Each electronic control module 14 is individually addressable and, therefore, supports manipulation of a specific device 12 among a population of such devices. Also, paging system 18 supports "group" broadcasting. This supports coordinated activity for group members, i.e., a set of similar devices 12. For example, all the "weather bears" in geographic region are addressed as one group and receive common information.

Furthermore, paging system 18 provides when necessary a linked list of control messages 16 to a given device 12 or group of devices 12. Accordingly, while generally referred to herein as a control message 16, it will be understood that a control message 16 may be of significant length provided by a series of separate paging system data packets delivered to a given education and entertainment device 12. Given an understanding of the paging system 18 and its ability to link together multiple data packets, it will be apparent to those skilled in the art that control message 16 size may vary from relatively small, such as required to trigger programmed activity by device 12, to relatively large, such as required to load sound data or application programming into device 12.

Paging system 18 collects information from many sources, typically by way of a telephone system. Information sources include a telephone 24 and an information collecting station 28 coupled by telephone connection 30 to the paging system 18 clearinghouse 20. Telephone 24 also couples to information collecting station 28 by telephone connection 30. Certain information originating at telephone 24 can be transmitted to device 12 from telephone 24 and by way of clearinghouse 20, while other information requires at station 28 processing or formatting outside normal paging system 18 operation.

As used herein, reference to telephone 24 shall refer to any telephone device in the proximity of, e.g., the same residence, as the device 12 and to any remote telephone device communicating with paging system 18 or station 28 by way of telephone connection 30. While illustrated as a telephone 24 it will be further understood that such illustration represents implementation also by modem and personal computer with appropriate programming to deliver more complex messages then would be conveniently entered by way of the keypad 24a of telephone 24. Accordingly, it will be understood that the illustration of and reference to telephone 24 represents also any such mechanism interactive with paging system 18 or station 28 by, for example, telephone connection 30, to cause transmission of a control message 16.

Information collecting station 28, provided by the manufacturer of device 12 or by separate service provider, collects information from a variety of information sources and delivers by way of paging system 18 the control messages 16 to device 12.

Control messages 16 submitted to paging system 18 by information collecting station 28 originate from weather information 34, news information 36, television story information 38, and manufacturer information 40. Information collecting station 28 collects information by various information channels 42 as appropriate for the specific information source. For example, channels 42 may represent electronic data delivery to station 28, or may be channels of information provided verbally or by written or printed representation. Thus, processing at station 28 may be automatic or may involve manual data organization and entry.

Weather information 34 includes current local weather conditions and forecasts. News information 36 includes any current events found in both local and broader scope coverage news services. Television story information 38 carries information relevant to storylines of current or upcoming television series episodes. As may be appreciated, weather information 34, news information 36, and television story information 38 need be processed and appropriately formatted by station 28 for delivery to device 12 by way of paging system 18 as a control message 16. Manufacturer information 40, however, may be preformatted and ready for transmission by paging system as a control message 16.

In use of weather information 34, information collecting station 28 prepares and transmits locally by way of paging system 18 a control message 16 causing device 12 to comment on the current local weather. For example, device 12 illustrated as a toy bear doll device 12a can be a "weather bear" keeping the user informed of current weather events. For example, the "weather bear" as provided by device 12a on rainy days announces the phrase "isn't it rainy today?" and on cold days announces the phrase "it is 40 degrees today, better dress warmly." In each case, device 12a provides precise and current real world weather information, not just preprogrammed audible stimulus.

News information 36 allows information collecting station 28 to transmit a control message 16 causing device 12 to comment on current news events. For example, device 12 informs the user that "today is President's Day", or that "today is the day everyone votes to choose our leaders in government." As may be appreciated, only the scope of current news coverage limits the variety of messages potentially enunciated by device 12 as a "news bear."

Thus, device 12 goes beyond traditional education and entertainment device capability. Device 12 captures interest with ever-changing commentary on real world events. As may be appreciated, such stimulus likely provokes in a child further exploration of the topics introduced by the device 12.

With television story information 38, information collecting station 28 broadcasts control messages 16 allowing device 12 to become part of current television series episodes such as provided by television 100 and television broadcast signal 102. For example, where device 12a corresponds to a character 17 in a given television series, story events currently appearing in broadcast television presentation, i.e., according to television storyline information 38, also appear as device 12a activity.

Incorporation of device 12 into a given television series storyline takes a variety of forms. For example, device 12 simply engages in activity corresponding to topics presented in a television broadcast storyline. In an educational context, device 12 focuses on educational topics currently presented in a corresponding educational television program. Alternatively, device 12 activity corresponds more closely too, and even coincides with, broadcast of specific acts or characteristics of television program characters. Thus, device 12 enunciates the same key phrases spoken by a corresponding character of the television program either synchronously with such announcement by the television program character, or at times relevant to the particular condition or situation of the corresponding television character during the storyline episode.

Manufacturer information 40 supplies additional information not normally obtained by information collecting station 28. The manfacturer may, for example, from time to time issue control messages 16 coordinated in some fashion with specific capabilities of the device 12 to augment use thereof. For example, device 12 adopts ever-changing features and capabilities according to a given schedule of modifications under manufacturer control. Alternately, the purchaser may after purchase add additional device capabilities. Under the present invention, the user need not purchase a new device 12, but rather may purchase transmission of an appropriate control message 16 to enable or establish additional device capabilities.

Telephone 24 provides for the owner, or the parents of the owner, an ability to generate control messages 16 for selected behavior or activity of device 12. For example, a parent may cause transmission, by way of telephone 24, of a control message 16 causing device 12 to enunciate a specific phrase. For example, the parent reminds the child to do homework, go to bed, brush teeth, or provides any of a variety of messages possibly more readily accepted and followed when provided by a friendly toy character. The parent uses device 12 to deliver such messages from a friendly source, i.e., device 12, rather than from only an authoritarian or parental source. Such message delivery by device 12 fosters eagerness to follow message directions when also given in conjunction by the parent.

Thus, the present invention takes advantage of a low cost, low power consumption radio signal receiver provided under the paging system 18 to establish a one-way communication link with such devices as education and entertainment toys for children. The invention integrates device 12 into current real world events or current or upcoming television episode events. Despite this powerful capability of dynamic ongoing relevant interaction with the owner, the device 12 need not include a user input device of traditional form, i.e., an array of buttons or data ports. Instead, the present invention utilizes inexpensive radio signal receiver technology to collect control messages 16, and in response adopts dynamically a broad spectrum of capabilities, attributes, and activity.

Figure 2:
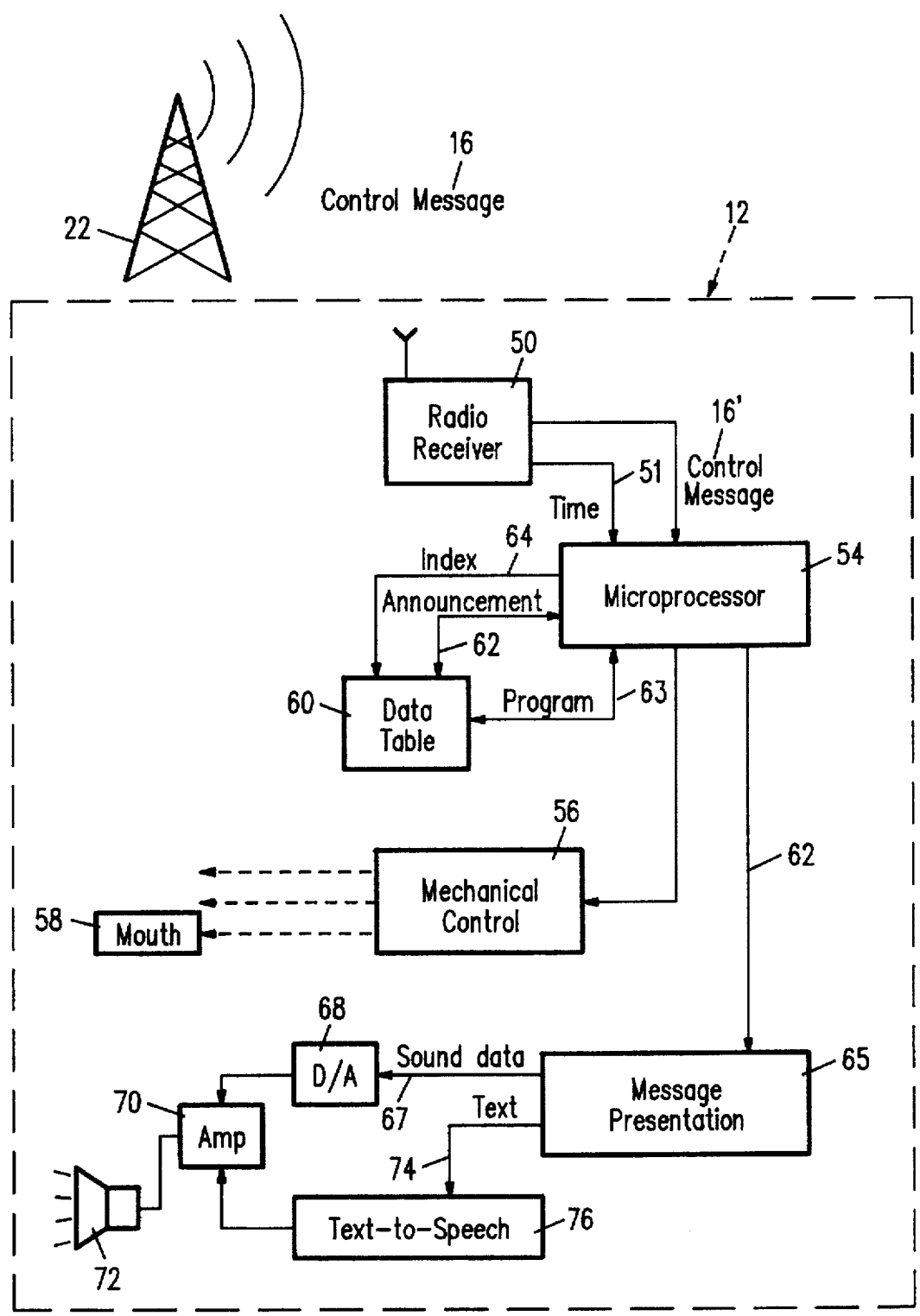
FIG. 2 is a block diagram of an education and entertainment device operating under within the entertainment and education system of FIG. 1.

FIG. 2 illustrates in block diagram the electronic control module 14 within a partial view of system 10, i.e., a view showing only broadcast facility 22. In FIG. 2, broadcast facility 22 transmits each control message 16 and a radio receiver 50 of module 14 collects control messages 16 by way of an antenna 52. Radio receiver 50 and antenna 52 define a data terminal operable under a given paging system protocol to collect control messages 16. As noted above, such paging system protocol may be of a variety of formats, but shown herein according to the Gaskill paging system operating under a time-division multiplex broadcast protocol.

Radio receiver 50 is, therefore, a highly battery-efficient device addressable both individually and as a member of a group. While radio receiver 50 includes significant signal processing resources, memory resources, and the like in implementation of reliable paging system 18 protocol and message 16 collection, under the illustrated embodiment receiver 50 operates within device 12 as a conduit for a control message 16. In other words, radio receiver 50 integrates into device 12 as a module to deliver an internal control message 16' to control circuitry of device 12. Accordingly, device 12 design need not be concerned with the particular paging system protocol, but rather need only rely on radio receiver 50 as an integrated package delivering internal control messages 16' originating from a remote source. Radio receiver 50 need not be significantly modified relative to its design as a paging device under paging system 18. Minor modification to radio receiver 50 allows microprocessor 54 to manipulate radio receiver 50, i.e., simulate what would otherwise appear to receiver 50 as pager device button activity, and extract paging information stored within radio receiver 50. In any event, radio receiver 50 serves its primary function by providing a conduit for presentation of an internal control message 16' to microprocessor 54.

Control message 16, as broadcast by paging system 18, includes a number of fields in implementation of broadcast protocol such as error correcting codes, time slot numbers, and other data relevant to the particular paging signal broadcast protocol employed, and also includes a message or data field. It is suggested that the message or data field be first collected by radio receiver 50, undergo error detecting and correcting procedures by receiver 50, and appear as internal control message 16'. Furthermore, control message 16' content or formatting dictates specific action by device 12. For example, control message 16 may represent data for later use by device 12 or may represent a command or application program causing device 12 to execute a given activity. The nature of the data delivered to device 12 and commands to which device 12 responds depends on the application of use. It is contemplated, therefore, that internal control messages 16' operate in coordination with microprocessor 54 programming to implement dynamic modification to device 12 operation, characteristics, or capabilities. Thus, microprocessor 54 programming accepts various forms of control message 16' and invokes certain activities or characteristics as a function thereof.

Mechanical control 56 represents any number of mechanical activities integrated into a given device 12. Continuing with the illustrated "weather bear" example as the device 12, control module 14 includes a mechanical control block 56 causing, when appropriate, movement of the bear doll mouth 58 as illustrated in coordination with presentation of a spoken message.

Radio receiver 50 also provides to microprocessor 54 a highly accurate time reference 51. As implemented under the Gaskill paging system, radio receiver 50 necessarily includes highly accurate time keeping circuitry supporting the time-division multiplexed protocol of the Gaskill paging system. Microprocessor 54 benefits from this time-division multiplexed protocol by receiving from radio receiver 50 the time reference 51. With time reference 51, microprocessor 54 engages in selected activity relative to a highly accurate time standard. For example, microprocessor 54 invokes selected device 12 activity at selected time of day or in synchronization with scheduled events such as events in a television series episode broadcast or household events such as tooth-brushing time.

A read/write memory resource provides a data table 60 containing a set of announcements available for enunciation by the device 12. Microprocessor 54, in response to an appropriate control message 16', loads data table 60 with an announcement 62 and associated index 64. Each announcement 62 may be stored as a text message, to conserve memory space within table 60, or may be stored as sound data where sufficient memory space is available in table 60. Accordingly, a control message 16 delivered to device 14 may carry text data or sound data. As may be appreciated, sound data may be generated by the author of a message by way of telephone 24 and converted to sound data at station 28, or may be sound data representing a particular character voice and provided as manufacturer information 40. Text data may also be delivered by way of a control message 16, and device 12 converts such text data to produce sound according to a given voice characterization, i.e., would consistently reproduce text-based messages according to a given character voice. In any event, data table 60 holds a variety of announcements available for use when appropriate in interacting with the owner of device 12. Microprocessor 54 later, by index addressing, collects announcements 62 from table 60 for enunciation by device 12.

A message presentation block 65 receives from microprocessor 54 sound data 67 ready for conversion by digital-to-analog block 68 and application to an amplifier 70 and speaker 72. An announcement 62 comprising text representation presented to block 65 by microprocessor 54 is delivered as message text 74 to a text-to-speech converter 76. Text-to-speech converter 76 then drives amplifier 70 causing device 12 to enunciate the desired message at speaker 72.

Internal control messages 16' also deliver to microprocessor 54 application programs 63 to be executed by device 12. Application programs are specific to a given use of education and entertainment system 10. For example, opening compartment 180 of the device 12e of FIG. 6 or allowing access to a given video game playing level such as device 12d of FIG. 5. Thus, application programs provided by way of a control message 16 may be programs in the native language, e.g., executable binary code, for microprocessor 54, or may be higher level language, e.g., a script language, executed by a supervising program running on microprocessor 54. In any case, application programs represent programming relative to device 12 causing selected activity thereof.

Because paging system 18 provides a one-way communication link to devices 12, management of index values applied to table 60 is, under the illustrated embodiment, external of device 12, i.e., index values are designated and later used by the source or entity placing information in table 60. As may be appreciated, index value selection schemes may be adopted wherein, for example, the manufacturer has access to a different set of index values than that of the owner or owner's parents. In this manner, conflicts among index values applied to table 60 are avoided. Each entity placing information into table 60 has knowledge of the index value provided at the time of loading such information into table 60 and, therefore, has basis for replacing such information or for extracting such information when desired from table 60, e.g., when triggering device 12 activity making reference to such information.

Figure 3:
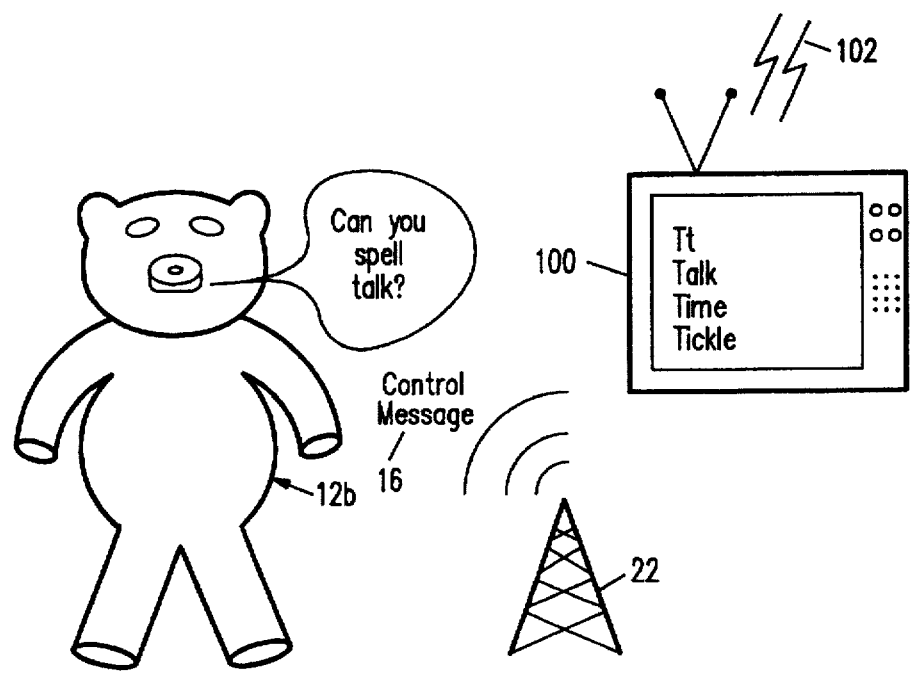
FIG. 3 illustrates an embodiment of the present invention as applied in an education context coordinating device action with current events in an educational television program.

FIG. 3 illustrates a next example of the present invention, designated as device 12b, employed in an educational context wherein device 12b becomes integral to a current television program lesson. In FIG. 3, a television 100 receives by television signal broadcast 102 a television program including, as illustrated in FIG. 3, a lesson regarding the letter "T" and several example words "talk", "time", and "tickle" beginning with the letter T. Also in FIG. 3, broadcast facility 22 provides one or more control messages 16 to device 12b. Device 12b enunciates the phrase "can you spell the word 'talk'?" in response to a message 16. As may be appreciated, enunciation by device 12b of a given phrase may be timed with a particular presentation on television 100, or may be presented at any time including during the particular television program or in time proximity thereto. For example, device 12b begins introduction to topics to be discussed in an upcoming educational television episode. Device 12b also discusses such topics during the educational television episode and after the educational episode to augment teaching provided by the television program.

Device 12 need not be exposed to or interact directly with the television 100 or broadcast signal 102 to obtain relevant information. Device 12 need not be present during the television program, but becomes an integral part of the television program by receiving control messages 16 relevant to current and specific television program topics and enunciating relevant commentary. Overall, the child is better educated, i.e., augmented relative to the educational television program alone, by having a second source of coordinated, relevant and timely educational material.

Figure 4:
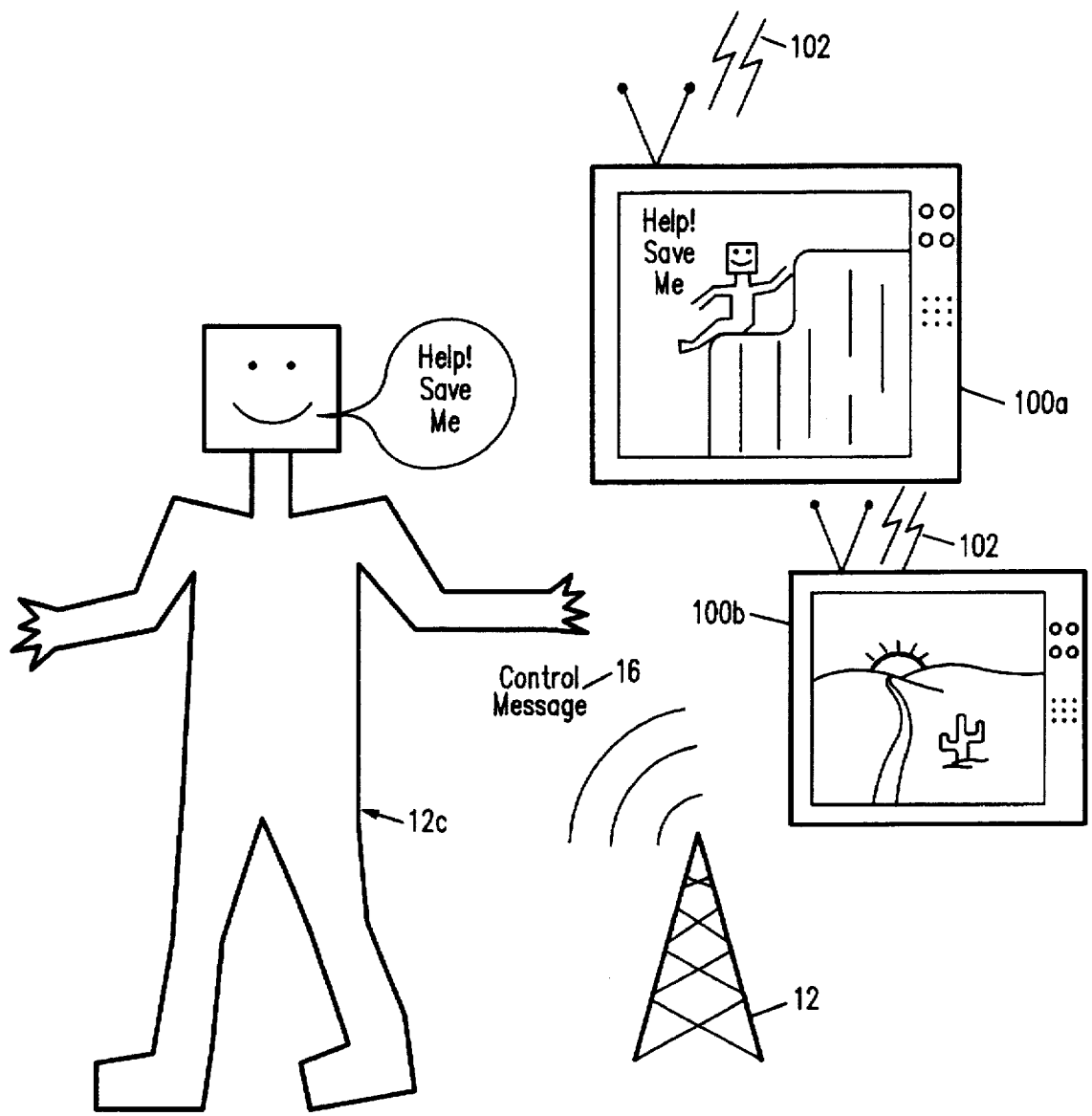
FIG. 4 illustrates another embodiment of the present invention, but in an entertainment context wherein operation of an entertainment device embodying a given television program character corresponds to the given television program character activity.

FIG. 4 illustrates an example of the present invention, designated as device 12c, including time activation of device 12c activity corresponding to a television display. In FIG. 4, device 12c receives from transmission facility 22 one or more control messages 16. In this case, device 12c is programmed via system 10 to enunciate the phrase "help, save me!" in response to a control message 16. FIG. 4 also shows television 100 at two different points in the television episode storyline, i.e., television display 100a at one point in the storyline and television display 100b at a later point. Television display 100a shows a character corresponding to device 12c trapped on a ledge of a cliff. In the television display 100a, the character corresponding to device 12c shouts "help, save me!" in response to a control message 16. By appropriately timing enunciation of the phrase by device 12c, the owner of device 12c enjoys augmentation of television programming. Device 12c need not, however, only enunciate the phrase in synchronization with that enunciated by the television character, but selectively enunciates the phrase when relevant to the storyline. As shown at television display 100b, device 12 enunciates the phrase "help, save me!" even when the corresponding character is not displayed. Thus, according to the television episode storyline the character is still trapped on the ledge during television display 100b. Accordingly, device 12 expresses commentary, e.g., "help, save me!", relevant to the storyline.

Figure 5:
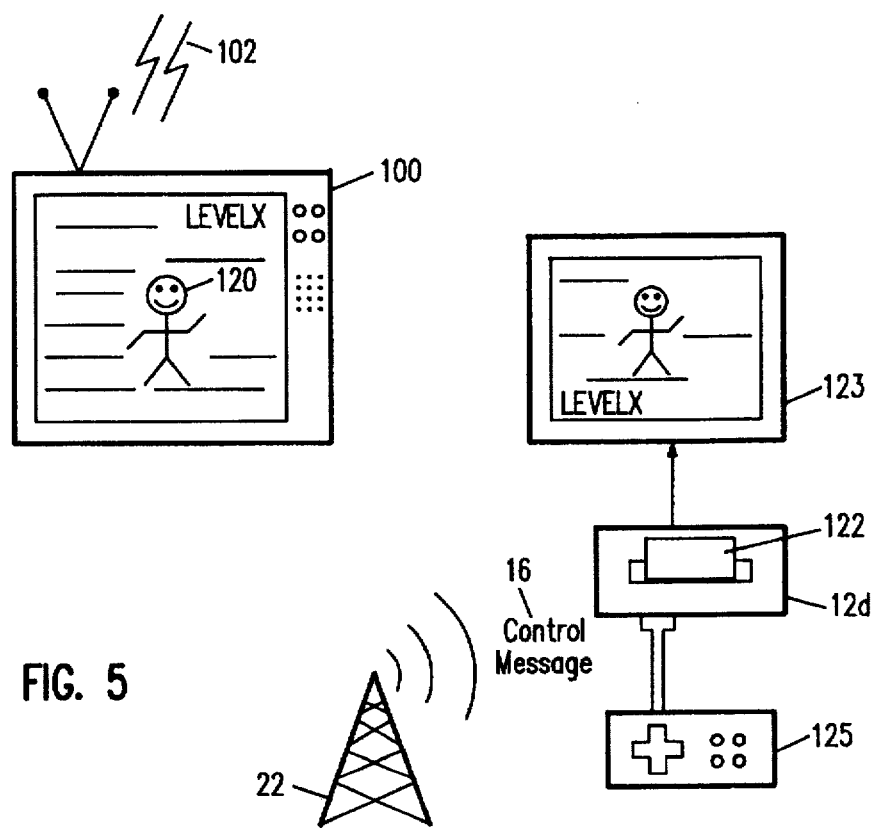
FIG. 5 illustrates an embodiment of the present invention coordinating entertainment device capability with a corresponding television program character capability.

FIG. 5 illustrates an example of the present invention, designated as device 12d, coordinating video game device 12d operation and television programming presented on television 100. In FIG. 5, television 100 receives by broadcast signal 102 a television program including a character 120 corresponding to a character 120 of the video game 12d.

Video game 12d receives control messages 16 by way of paging system 18. In accordance with conventional video game operation, video game 12d drives a display terminal 123 and reacts to user manipulation of a game controller 125. Furthermore, video game programming contained in ROM cartridge 122 implements a given entertainment presentation, e.g., a video game. In accordance with the present invention, however, video game programming as contained in the ROM cartridge 122 allows access to certain programming features only under authorization provided by an appropriate control message 16. Thus, when character 120 in the television episode storyline finally reaches level X, paging system 18 transmits an appropriate control message 16 to cause video game 12d to allow access to a new level, i.e., level X, in the video game device 12d. In this manner, the television program storyline corresponds to a new capability of video game device 12.

Furthermore, the television program storyline as presented to the user of video game 12d on television 100 may provide additional clues to interaction with the video game 12d, i.e., clues pertinent to activities in an advancement beyond or game play within "level X." For example, certain passwords or knowledge may be required to succeed in reaching or mastering "level X.". Such passwords or information can be loaded into video game 12d subsequent to manufacture thereof and subsequent to publishing of programming on ROM 122. More particularly, by appropriately configuring video game 12d and ROM 122 to receive alternate configurations by way of control messages 16 existing game programming is modified to reflect current television storyline events, or simply to provide dynamic operation. In this manner, game play need not be fixed at the time of manufacture, but rather may dynamically follow ongoing events, e.g., real world events or television programming events.

Figure 6:
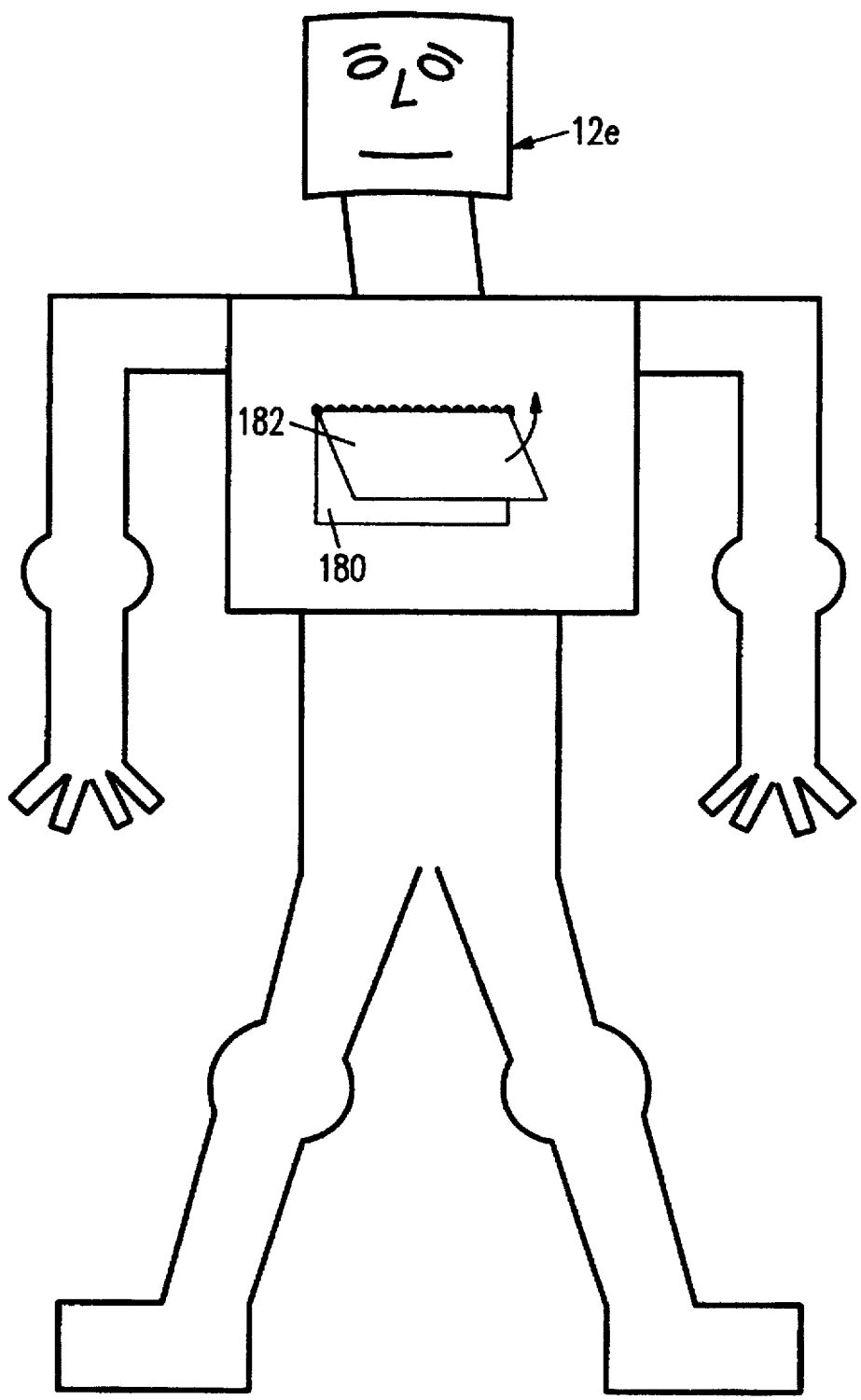
FIG. 6 illustrates an embodiment of the present invention providing a new entertainment device capability.

FIG. 6 illustrates a device 12e configured as a toy robot. Device 12e further includes a compartment 180 with a lid or cover 182. Cover 182 is spring-loaded and latched shut. In the embodiment of FIG. 6, mechanical control 56 (FIG. 2) controls a latch mechanism (not shown) holding shut cover 182. Thus, by transmission of an appropriate control message 16 directed to device 12e mechanical control 56 releases the latch holding shut cover 182. In this manner, compartment 180 selectively opens by transmission of an appropriate control message 16. Thus, compartment 180 becomes accessible by authority of a parent, manufacturer, or owner possessing appropriate knowledge to cause transmission of the necessary control message 16. For example, compartment 180 holds a reward for a child. The reward is unaccessible until the parent, by way of telephone 24, causes transmission of an appropriate control message 16 to unlatch cover 182. Similarly, a manufacturer of device 12e provides access to compartment 180 only after a given event, e.g., a corresponding character in a television series episode having gained access to such corresponding compartment. In any case, device 12e capability is augmented in response to an appropriate control message 16.

Figure 7:
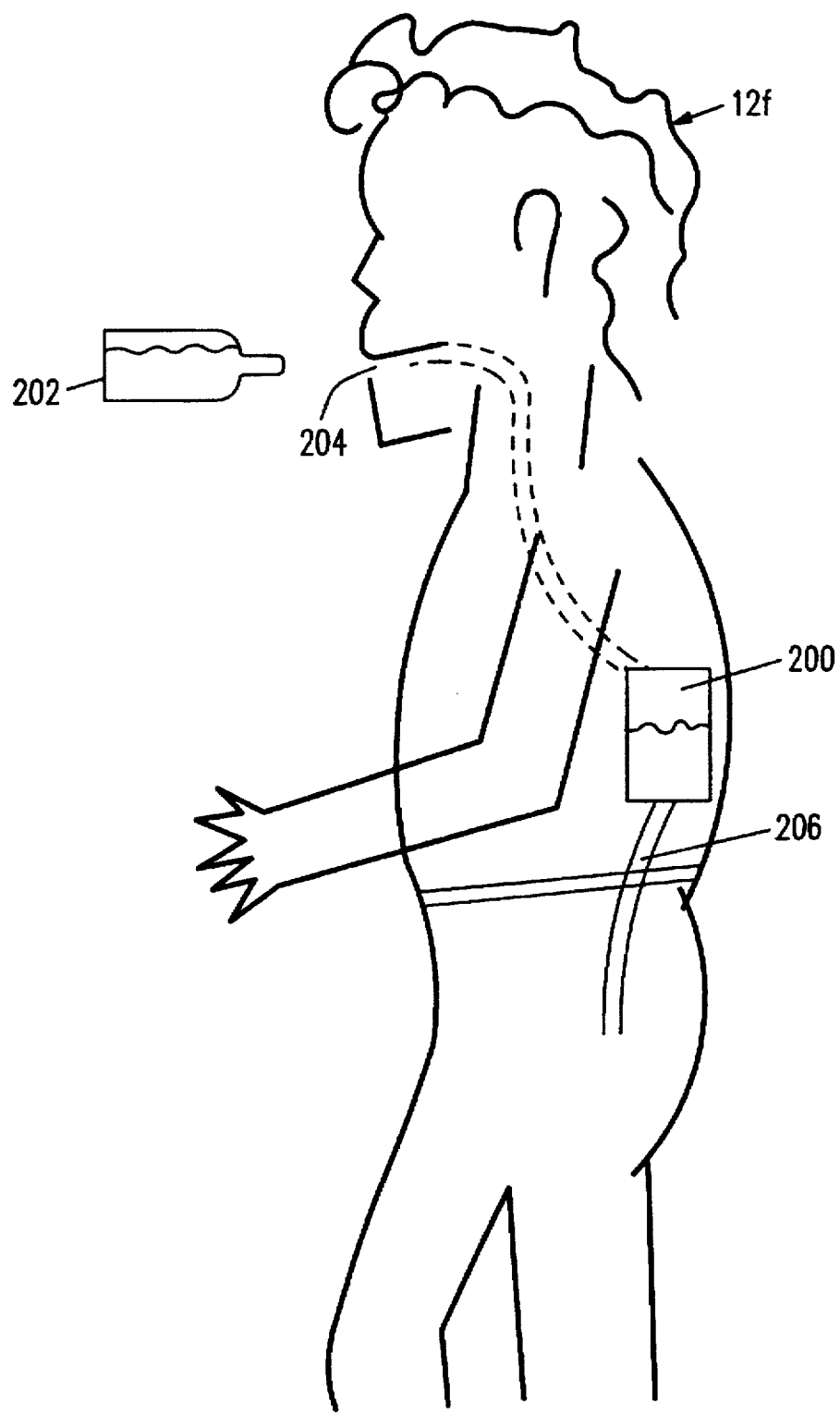
FIG. 7 illustrates an embodiment of the present invention allowing selected activity of an entertainment device.

FIG. 7 illustrates another example of the present invention, designated as device 12f, wherein device 12f includes a control module 14 as described above, and further includes a water reservoir 200. In operation, a user fills reservoir 200 using a bottle 202 through the mouth 204 of a doll embodying device 12f. Reservoir 200 includes an outlet tube 206. In operation, device 12f of FIG. 7 is first loaded with an announcement 62 "I'm thirsty, please give me my bottle" and also loaded with an announcement 62 corresponding to a crying sound. Once the announcements 62 are loaded into data table 60 of device 12f, i.e., loaded by way of an appropriate control message 16, a further control message 16 commands device 12f to enunciate the phrase "I'm thirsty, please give me my bottle." Device 12f then receives from the owner fluid from bottle 202 and into reservoir 200. Subsequently, device 12f programming emits the crying sound while concurrently releasing fluid by way of outlet 206. As may be appreciated, this scenario corresponds to feeding of a child and subsequent need to change the child's diaper. Thus, a device 12f sold without the capability of such simulated behavior can adopt such behavior, by, for example, the manufacturer providing suitable control messages 16 to allow such simulated behavior by device 12f. Similarly, the owner or parents of the owner of device 12f cause such simulated behavior by way of telephone 24.

Figures 8, 9:
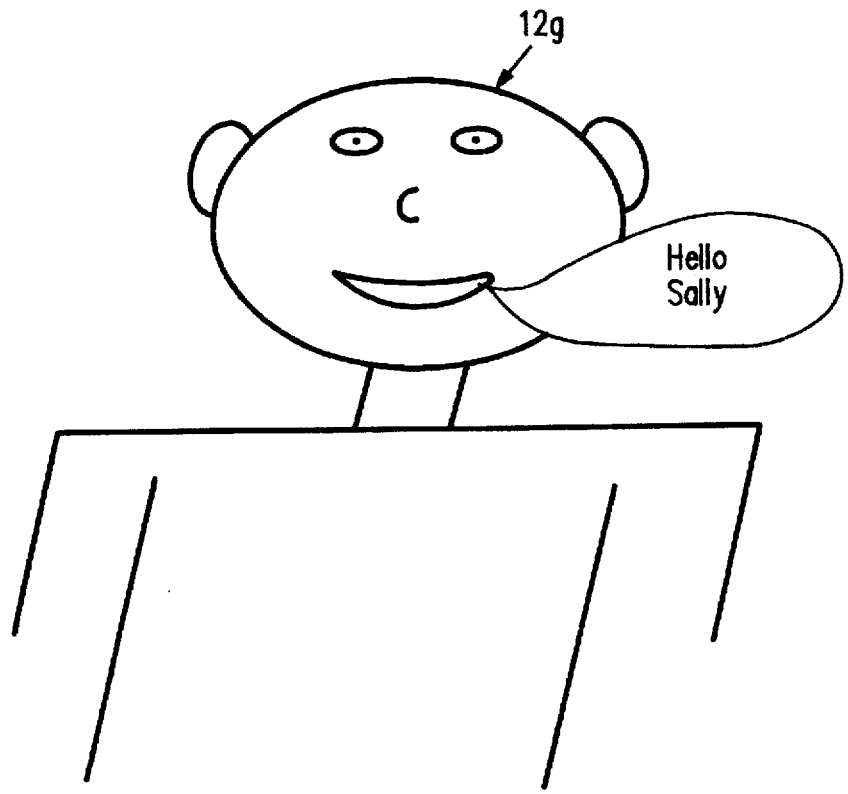
FIG. 8 illustrates user-specific programming of an entertainment or education device after purchase and without direct physical manipulation of the device by the user.
FIG. 9 illustrates a command set applicable generally to the education and entertainment system of the present invention.

FIG. 8 illustrates another example of the present invention wherein device 12g comprises a talking doll and the above-described control module 14. As may be appreciated, at the time of manufacture, many individual devices 12g are sold to many different persons. Once sold, however, and placed in the hands of a specific child, device 12g is customized to refer to one child by name. Thus, an appropriate control message 16 sent to device 12g including an announcement 62 referring specifically to the child by name establishes a customized device 12g activity. For example, if the owner of device 12g is named "Sally" then an appropriate control message 16 addressed specifically to this device 12g loads into data table 60 the name "Sally" and device 12g incorporates such phrase into comments directed to the child. For example, in FIG. 8, device 12g announces "hello Sally" thereby establishing a customized feature specific to the owner.

Despite this highly personalized feature, device 12g requires no user interface other than radio receiver 50. As may be appreciated, customized information may be loaded into device 12 by a variety of mechanisms under the present invention. For example, the parents of the owner of device 12 enter data by way of telephone 24. Alternatively, upon purchase of a device 12, the owner fills out registration information and returns it to the manufacturer. In turn, the manufacturer develops appropriate manufacturer's information 40 for submission to information collecting station 28. Station 28 in turn directs control messages 16 to appropriate devices 12 whereby personalized custom information is loaded without the user engaging in any physical manipulation of the device.

The above described embodiments of the present invention show by example the versatility and advantage provided by the present invention. Generally, the present invention provides access to inexpensive yet complex processing capabilities of an electronic device by way of remote broadcast radio signal. The radio signal broadcasting facilities may comprise pre-existing transmission facilities such as conventional paging system and related broadcast protocols. As noted herein, highly battery-efficient and highly miniaturized paging system signal receiving devices, i.e., such as in the Gaskill paging system, are desirable. Given access to paging system broadcast facilities, the present invention may be applied in many geographic areas and in many different applications in the educational and entertainment field.

The following flow charts illustrate a suggested general control scheme for manipulating a population of devices 12 operating under education and entertainment system 10 of the present invention. In the following flow charts, specific reference to a particular application of the present invention, e.g., as a weather doll or a video game, shall be omitted with the understanding that the control scheme suggested may be applied across a variety of applications. Device operation specific to a particular application falls generally under the control scheme presented in the following flow charts, but as will be appreciated by those skilled in the art is modified to accommodate specific end uses of education and entertainment system 10.

FIG. 9 illustrates a suggested simplified command set under the present invention to accomplish delivery of information to a specific device 12 or a specific group of devices 12. As may be appreciated, the commands illustrated in FIG. 9 appear in coded form as the internal control messages 16' and programming of microprocessor 54 responds according to procedures implemented under the specific application.

In FIG. 9, commands 250 originate from information collecting station 28 or telephone 24 and arrive by way of paging system 18 at a designated educational and entertainment device 12. The particular commands 250 detailed in FIG. 9 implement a basic control scheme allowing preliminary loading of information and later triggering or causing execution of a command referencing such data. In this manner, commands referencing significant volume of data or program code, e.g., sound data, long text messages, or application programs, execute in timely fashion, e.g., at a particular time and synchronously with a given television storyline event, without depending on transmission timing characteristics of the particular paging system 18 employed, i.e., delay as a function of paging system protocol. Furthermore, and as stated herein above, each internal control message 16' can comprise one or more paging system data packets transmitted under the particular paging system 18 employed. Linking together of related data packets may be accomplished by way of such capability provided under paging system 18, or by virtue of device 12 recognizing related incoming internal messages 16' and constructing a complete sequence of such data packets prior to use.

Load text command 252 includes a command identification field 252a, a text data field 252b, and an index field 252c. In response to command identification field 252a microprocessor 54 writes a copy of the text data field 252b into data table 60 in association with an index value provided by index field 252c. Similarly, load sound command 254 includes a command identification field 252a causing microprocessor 54 to collect and write into data table 60 the sound data field 254b in association with an index corresponding to the index field 254c. Thus, commands 252 and 254 allow education and entertainment system 10 to deliver potentially large quantity of data in advance of device 12 activity referencing such data.

Announce command 256 includes a command identification field 256a causing microprocessor 54 to present the announcement 62 in data table 60 corresponding to the index field 256b. Furthermore, a when field 256c indicates to microprocessor 54 when the announcement is to occur. The when field 256c indicates immediate presentation of the corresponding announcement 64, or indicates a time the announcement 62 is to be presented by device 12. Device 12, having reference to the highly accurate time reference 51, synchronizes given device 12 activity, e.g., a message announcement, at precise times.

Load program command 258 includes a command identification field 258a causing collection by microprocessor 54 of program code field 258b for storage in data table 60 as a function of the index field 258c. Thus, education and entertainment system 10 preloads application programs into each device 12. Execute program command 260 includes a command identification field 260a causing microprocessor 54 to the application program stored in data table 60 at the index value indicated in index field 260b. Execute program command 260 further includes a when field 260c indicating a time of execution for the subject application program. When field 260c indicates immediate execution of the subject application command, or indicates a precise time of execution therefor relative to the time reference 51.

Figure 10:
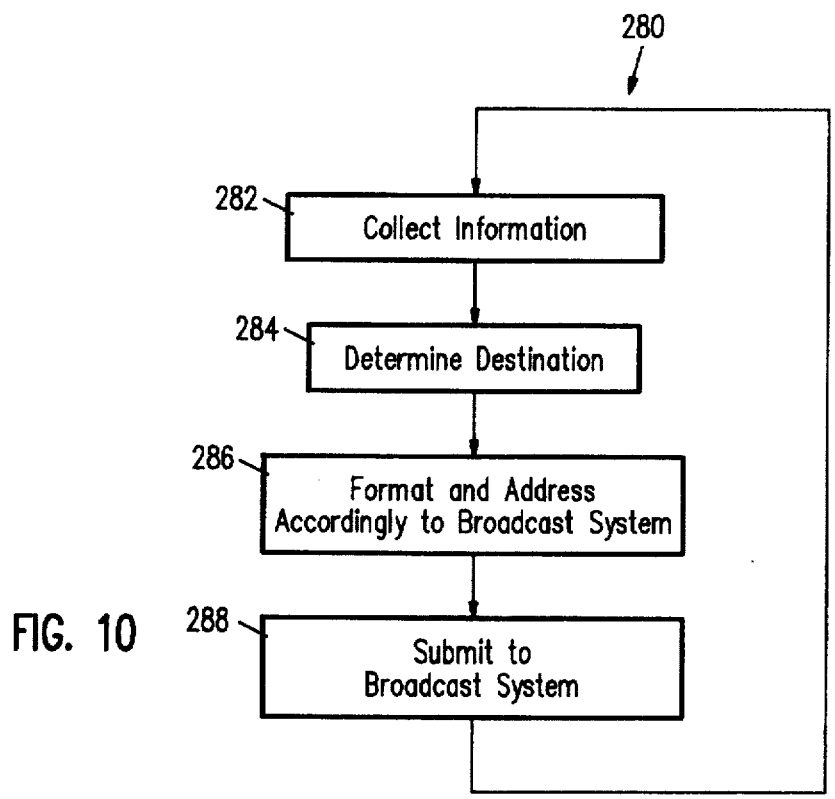
FIG. 10 illustrates programming relative to an information collection portion of the education and entertainment system of the present invention.

FIG. 10 illustrates processing executed by the information collecting station 28. In FIG. 10, a control loop 280 cycles through the blocks 282, 284, 286, and 288 collecting information from telephone 24 and by way of channels 42. Block 282 represents collection of a given body of information. For example, processing in block 282 includes collection of information relative to upcoming television series storylines or a collection of news event information. In any case, station 28 fulfills its primary purpose of collecting and organizing information in block 282.

In block 284, station 28 determines a destination or destinations for information collected. For example, weather information may be addressed to a group of "weather bears" or information relevant to a given character in a given television series episode may be directed to a group of devices 12 corresponding to that given character. Information specific to a particular device 12, e.g., data or custom programming specific to one device 12, is addressed specifically thereto by station 28 in block 284.

Continuing to block 286, station 28 formats and addresses the collected information according to the paging system 18 broadcast protocol. Generally, station 28 submits to paging system 18 a page message having as its data or message field the intended internal control message 16'. Programming executing on microprocessor 54 recognizes the content and format of internal control message 16' and reacts accordingly. In block 288, information collecting station 28 submits the formatted information to the paging system for broadcast as the control messages 16. As indicated above, the message or data portion of such paging system 18 broadcast represents the internal control message 16' applied to and driving operation of microprocessor 54.

Figure 11:
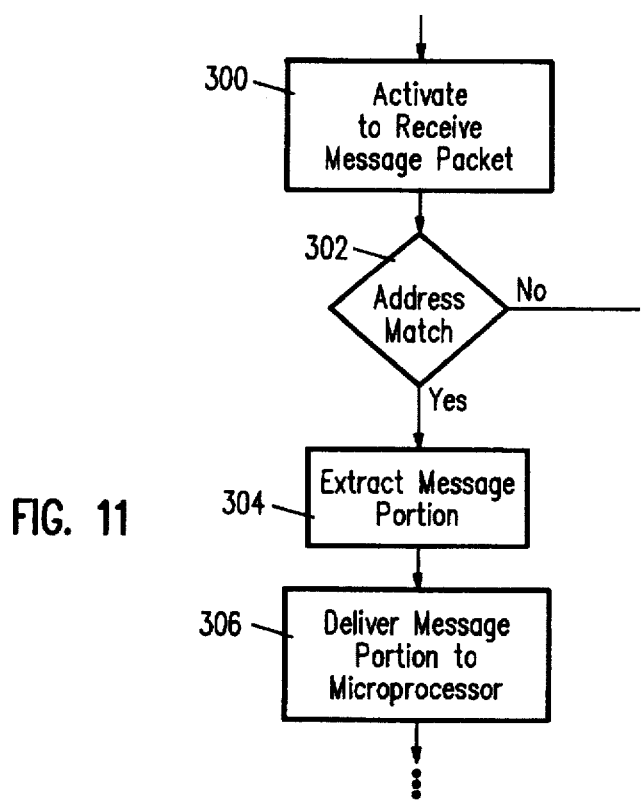
FIG. 11 illustrates collection by radio signal of control information at a radio receiver device of an education and entertainment device of the present invention.

FIG. 11 illustrates by flow chart operation of the radio receiver 50. As may be appreciated, delivery of an internal control message 16' to microprocessor 54 by way of radio signal may be conducted according to a number of arrangements. In the illustrated and preferred embodiment of the present invention, however, paging system 18 conveys information to microprocessor 54. Thus, programming in FIG. 11 indicates operation of radio receiver 50 under the Gaskill paging system 18. In block 300, radio receiver 50 activates according to the time-division multiplexed paging system broadcast protocol to receive a message data packet, i.e., one bundle of data provided during a time slot associated with the radio receiver 50.

In decision block 302, radio receiver 50 determines whether an address portion, either group or individual address, of the message data packet matches the address of radio receiver 50. If no match occurs, then processing branches to other programming. If an address match does occur, however, then processing advances to block 304 where the message or data portion of the message packet is collected as the internal message 16' and, in block 306, the internal message 16' to microprocessor 54. As noted herein above, the Gaskill paging system supports linked data packets whereby programming represented by FIG. 11 includes collection of linked data packets and gathering together related packets as a single internal control message 16' for delivery to microprocessor 54. Alternatively, individual paging system data packets are passed along to microprocessor 54 as received, and microprocessor 54 recognizes related, i.e., linked, components and constructs the linked components as a single control message 16'.

Figure 12:
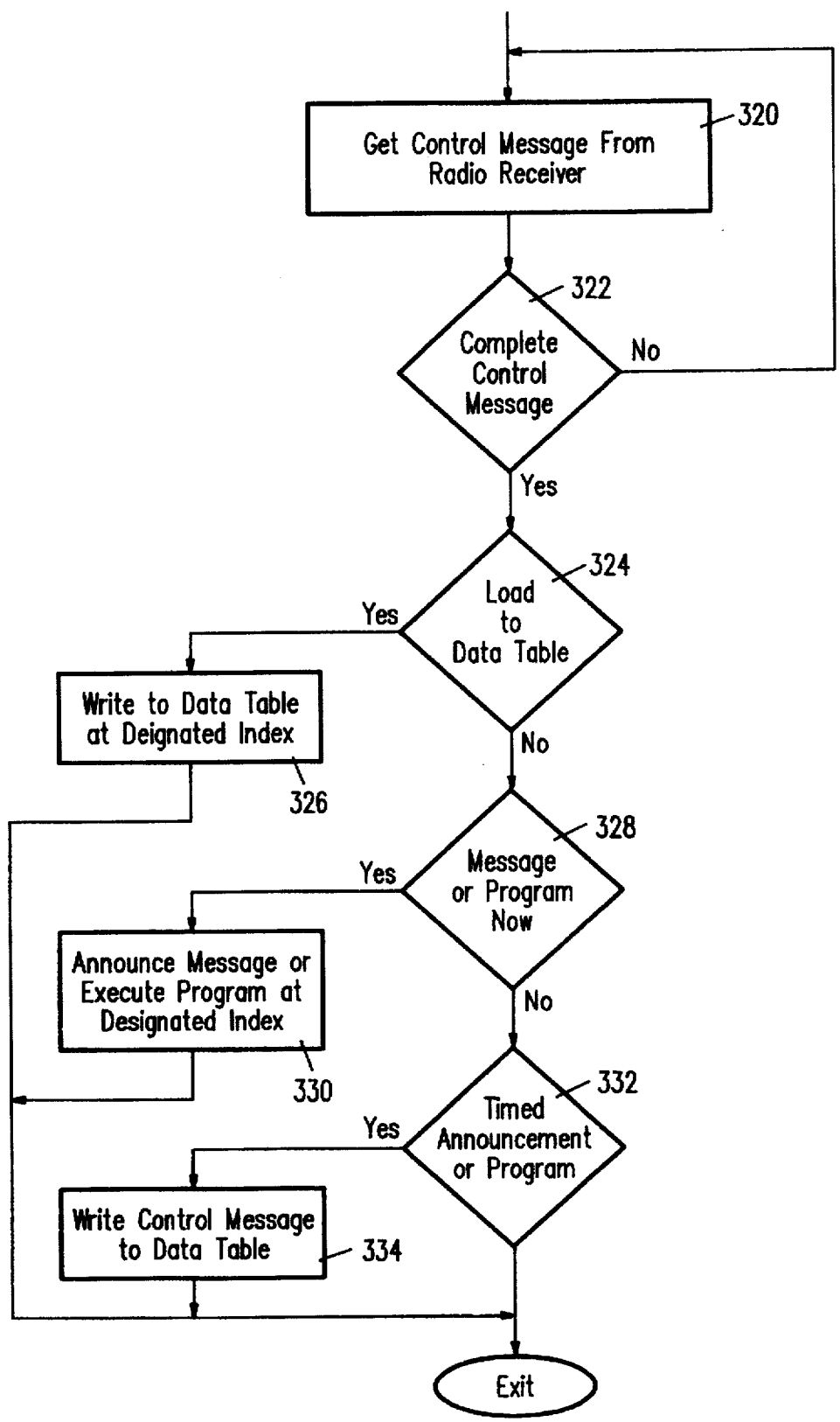
FIG. 12 illustrates programming of an education and entertainment device operating under the present invention.

FIG. 12 illustrates programming of microprocessor 54 in response to the commands 250. As may be appreciated, the particular programming illustrated in FIG. 12 reflects the nature of the illustrated commands 250, and varies as necessary to accommodate different or additional commands 250. In FIG. 12, processing begins in block 320 when microprocessor 54 gets an internal control message 16' from radio receiver 50. In decision block 322, microprocessor 54 determines whether a complete control message 16' has been received. For example, when delivering a large volume of data in a control message 16, e.g., sound data, a number of paging system data packets carry the entire internal control message 16'. Decision block 322 represents programming within microprocessor 54 recognizing a sequence of such related paging system data packets and collection of such sequence until a complete internal control message 16' is received by radio receiver 50 and delivered to microprocessor 54.

Having received a complete internal control message 16', processing advances to decision block 324 where microprocessor 54 determines need to write information to the data table 60. For example, load text command 252, load sound command 254, and load program command 258 cause branching at decision block 324 to block 326 where microprocessor 54 writes the associated one of fields 252b, 254b, or 258b in data table 60 for access later as a function of the associated one of index field 252c, 254c, or 258c, respectively.

If no table 60 load operation is indicated in block 324, processing advances to block 328 where microprocessor 54 determines need to enunciate immediately an announcement 62 or to execute immediately an application program 63 previously stored in data table 60. For example, decision block 328 interrogates the when field 256c and when field 260c of commands 256 and 260, respectively. If an announcement is to be presented or application program executed immediately, processing branches through block 330 where microprocessor 54 accesses data table 60 at the indicated index, e.g., as indicated by index fields 256b and 260b of commands 256 and 260, respectively. The corresponding announcement is presented or application program executed in block 330.

If no announcement or program is to be executed immediately, processing advances from decision block 328 to decision block 332 where microprocessor 54 determines need to schedule an announcement or application program execution. For example, previously loaded announcements 62 or programs 63 may be triggered by the announce command 256 and execute program 260, respectively. The when fields 256c and 260c are interrogated in decision block 232 to identify a time of execution for the announcement or command associated with the index fields 256b and 260b, respectively. Thus, if an announcement or command is to be scheduled, processing branches through block 334 where the just received internal message 16', e.g., one of the commands 256 or 260, is stored in an event schedule for later reference as described hereafter with reference to FIG. 13.

Figure 13:
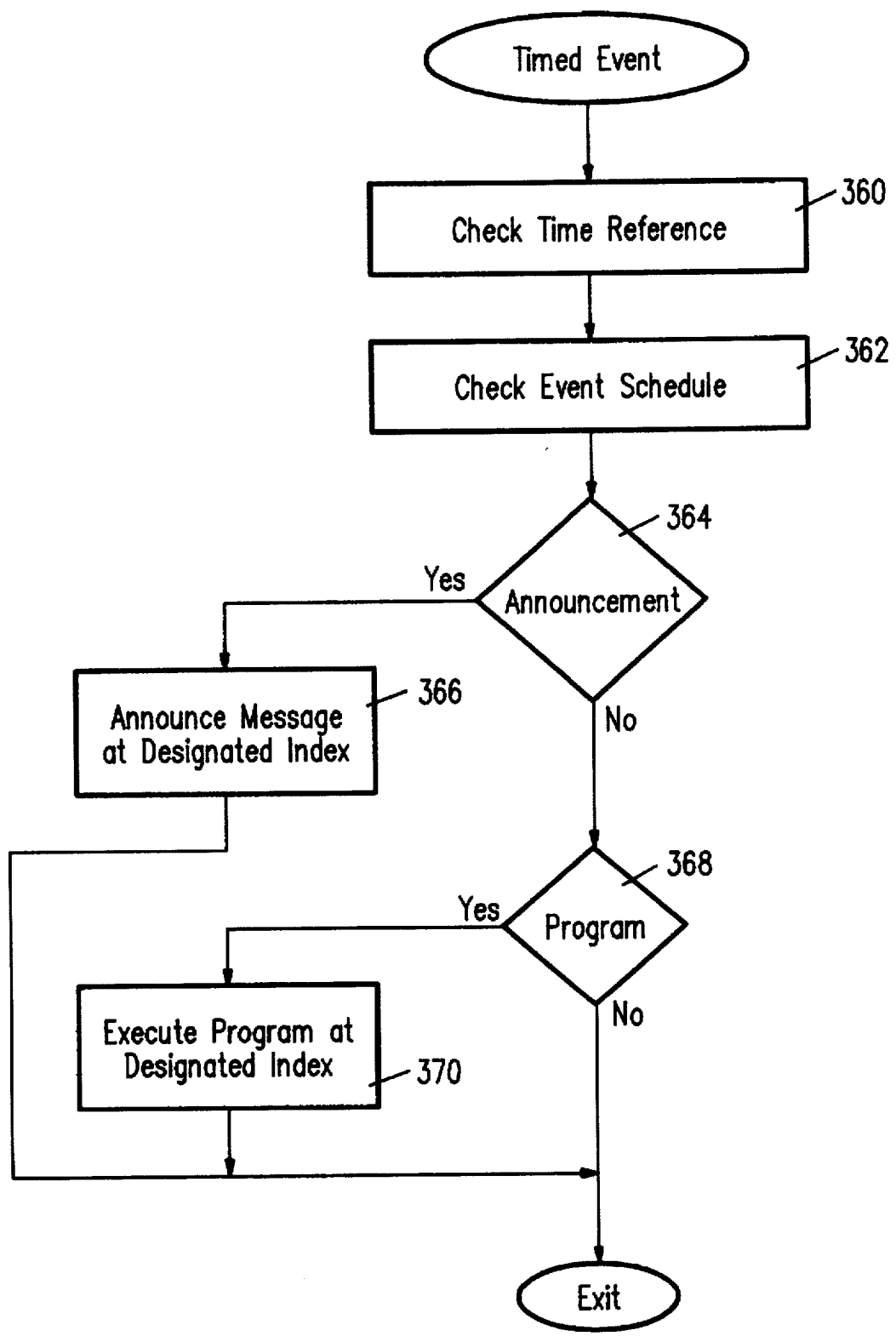
FIG. 13 illustrates programming of an education and entertainment device under the present invention according to a timed activity feature.

FIG. 13 illustrates programming of microprocessor 54 in implementation of a timed activity by device 12. In FIG. 13, it will be assumed that microprocessor 54 maintains an event schedule with entries each indicating a command identification field, a data table 60 index field, and a when field. For example, the event schedule stores commands 256 and 260 as described above in connection with blocks 332 and 334 of FIG. 12. Programming of FIG. 13 represents intermittent interrogation of the event schedule and, when appropriate, execution of the corresponding activity. In FIG. 13, processing begins in block 360 where microprocessor 54 reads the time reference 51. Continuing to block 362, microprocessor 54 compares the current time reference 51 as obtained in block 360 against items stored in the event schedule. If the time has come for presentation of an announcement, processing branches at decision block 364 through block 366 where device 12 presents the announcement 62 associated with the index value provided by the event schedule. If the time has come for application program execution, then processing branches at decision block 368 through block 370 where an application program, as previously stored in data table 60 at an index provided now by the event schedule, is executed.

Thus, an improved method and device for entertainment, education, and communication has been shown and described. The present invention is particularly well suited for integration into entertainment and educational devices such as children's toys which desirably include an inexpensive, yet sophisticated, user input device in the form of a small radio receiving data terminal similar to that used in paging devices. A paging system may then be employed to download information into the device according to a variety of scenarios. The device under the present invention provides relevant, current, and selectable interaction, enunciations, capabilities, and configurations as a function of real world information or information relevant to television series storylines. Overall, the device opens a new channel of communication to the person making use of the entertainment device, to augment entertainment or educational aspects of other sources of information. The device under the present invention does not, however, depend on any complex or expensive user interface mechanism or depend on television signal broadcasting or exposure to a television image to augment its capabilities or features. Instead, the entertainment device under the present invention advantageously receives such configuration information independently by separate radio signal and may be loaded with such information at any time according to a variety of paging system protocols.

It will be appreciated that the present invention is not restricted to the particular embodiment that has been described and illustrated, and that variations may be made therein without departing from the scope of the invention as found in the appended claims and equivalents thereof.

What is claimed is:

1. An entertainment device comprising, a television system including a television receiver for displaying at least one character performing according to a storyline, radio means for transmitting addressed messages to a plurality of selective call receivers, said messages including spoken dialog, a doll having the appearance of said character, said doll including therein one of said selective call receivers, activation means in said doll for causing said doll to respond to external stimuli for generating spoken dialog, means in said doll for storing a message including a particular spoken dialog received via said selective call receiver in said doll, whereby the response to said activation means includes at least part of said particular spoken dialog, whereby said doll can respond to external stimuli in a manner appropriate to said storyline performed by said character on said television receiver.

2. An entertainment unit comprising, a first entertainment means including means for displaying at least one character performing according to a storyline, means for transmitting addressed messages to a plurality of selective call receivers, said messages including spoken dialog, a second entertainment means having the appearance of said character, said second entertainment means including therein one of said selective call receivers, activation means in said second entertainment means for causing said second entertainment means to respond to external stimuli for generating spoken dialog, storage means in said second entertainment means for storing a message including a particular spoken dialog received via said selective call receivers, whereby said second entertainment means can respond to external stimuli in a manner appropriate to said storyline performed by said character on said first entertainment means.

3. A system for coordinating a plurality of entertainment means comprising, a first entertainment means for displaying at least one character performing according to a storyline, a second entertainment means including a first means having the visual appearance of said character, radio means for transmitting addressed messages to a plurality of selective call receivers, said messages including spoken dialog and programming commands, said first means including therein one of said selective call receivers, activation means in said first means for causing said first means to respond to external stimuli for generating spoken dialog and for performing actions in response to said programming commands, means in said first means for storing a message including a particular spoken dialog and programming commands received via said selective call receiver in said first means, whereby the response to said activation means includes at least part of said particular spoken dialog, whereby said first means can respond to external stimuli in a manner appropriate to said storyline performed by said character in said first entertainment means.

* * * * *